Dec. 21, 1965        J. P. BLAHA ETAL        3,224,411
APPARATUS FOR APPLYING ADHESIVE TO A SURFACE
Filed Sept. 18, 1961                    2 Sheets-Sheet 1

JESS P. BLAHA
FREDERICK R. COTTON
ANTHONY P. GORBE
*INVENTOR.*

BY
*John R. Faulkner*
*Thomas H. Oster*
ATTORNEYS

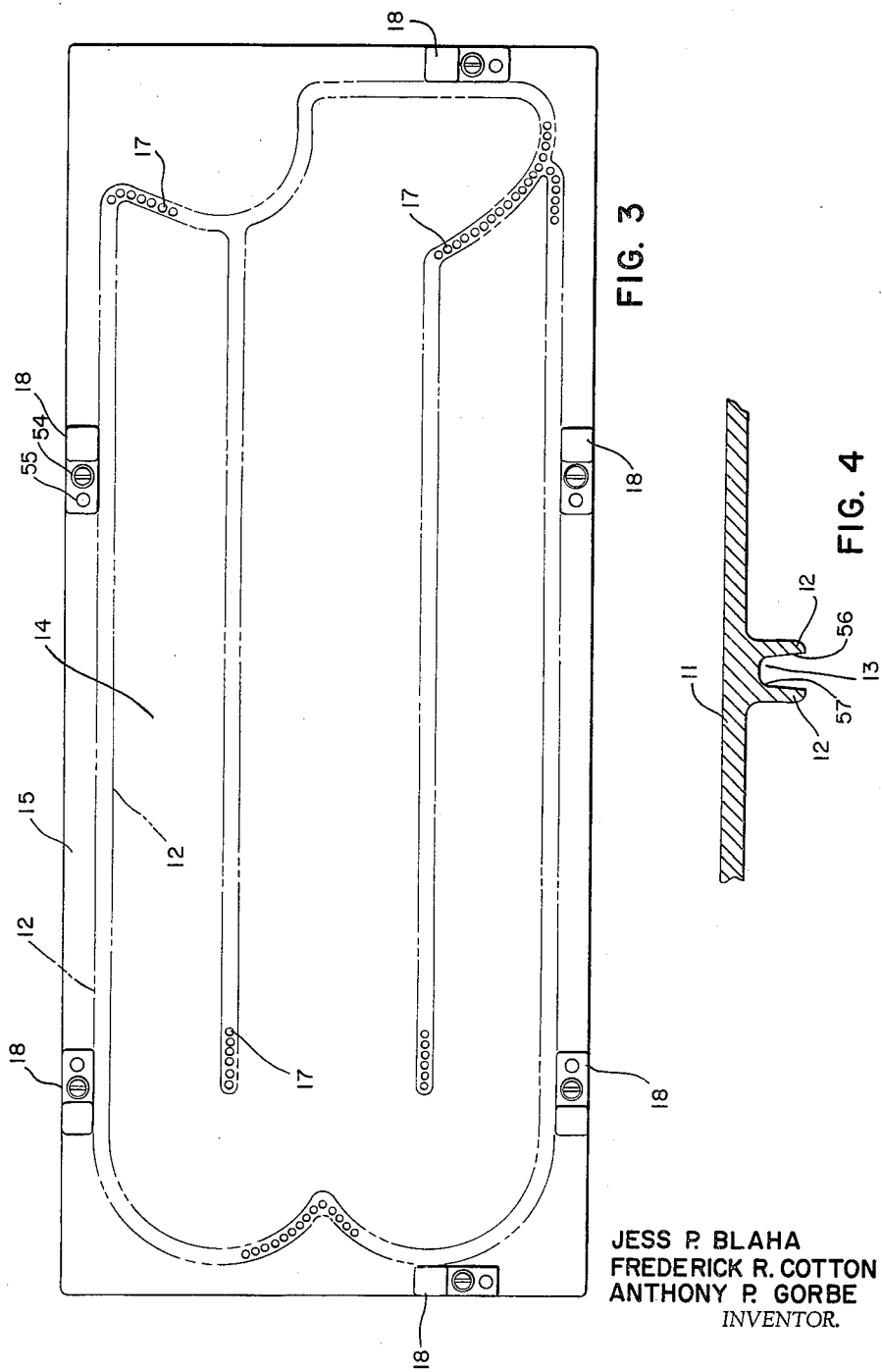

United States Patent Office 3,224,411
Patented Dec. 21, 1965

3,224,411
APPARATUS FOR APPLYING ADHESIVE
TO A SURFACE
Jess P. Blaha, Detroit, Frederick R. Cotton, Novi, and Anthony P. Gorbe, Melvindale, Mich., assignors to Ford Motor Company, Dearborn, Mich., a corporation of Delaware
Filed Sept. 18, 1961, Ser. No. 138,707
2 Claims. (Cl. 118—408)

This invention relates to an apparatus of applying a siccative, flowable material to a surface of a member, or more particularly, to an apparatus of uniformly applying an adhesive to a groove of a first member so that a second member having a coextensive tongue may be adhesively joined with the first member.

Current methods of applying an adhesive to grooves of tongue and groove jointed members are performed manually with the assistance of extrusion guns. Extruded beads of adhesive are slowly deposited in the grooves by manually moving the tip of the extrusion gun along the entire length of the groove. Other attempts at improving the curent methods for applying adhesive as, for example, by the use of mechanically operated extrusion guns, specially designed hand tools, or injection techniques have failed to achieve a satisfactory and uniform distribution of the adhesive in the groove within an optimum time cycle to make the adhesive joining of tongue and groove members economical on a mass production basis.

To effect the economical application of highly viscous adhesives for joining members or parts, the apparatus of this invention have been developed. The method comprises the steps of securing a member having a grooved portion to the top surface of an applicator plate. The applicator plate has a plurality of hollow perforations which place the surface of the applicator plate in communication with a secondary manifold which in turn is connected to a primary manifold by distribution tubes. A receding piston is mounted in one end of the primary manifold. A supply hose delivers adhesive to the primary manifold from an adhesive storage container. Delivery is effected by pumping the adhesive from the storage tank to an adhesive chamber of a constant pressure pump. The piston of this pump acts on the adhesive stored in the adhesive chamber to deliver it to the primary manifold at a constant pressure when a valve in the system is opened. The pressure exerted by the constant pressure pump forces the adhesive from the primary manifold into the secondary manifold. The adhesive is then forced through the hollow perforations to deposit as a uniform bead in the groove of the member secured to the applicator plate. After the groove is filled with adhesive, the valve in the system is closed. The receding piston mounted in the primary manifold is actuated to relieve the pressure on the adhesive in the manifolds, thereby eliminating drool of the adhesive through the perforations of the applicator plate and maintaining the adhesive in the chamber.

The apparatus of this invention permits the removal of a member quickly and cleanly from the surface of the applicator plate. Also, excessive adhesive on the surface of the applicator plate between applications is eliminated, thereby increasing the speed of positioning and applying adhesive to subsequent grooved members. By maintaining the adhesive in the chamber between applications, the aeration of the adhesive is prevented.

An object of this invention is to provide an apparatus for applying a siccative, flowable material to a grooved portion of members economically and on a repetitious basis.

A further object is to provide an improved apparatus for applying adhesive to surfaces which does not require down time to clean the applicating device between the application of adhesives to the surface of each member.

A further object is to provide a simple and efficient apparatus that is capable of applying a uniform bead of adhesive to the grooved portions on the surface of a member within a relatively short time cycle.

A further object of this invention is to provide an apparatus for applying adhesive which will maintain the adhesive at a uniform viscosity.

Other objects and advantages of this invention will become more apparent when the following description is considered in connection with the accompanying drawings in which:

FIGURE 3 is a plan view of the applicator plate to which the manifold pan is secured; and, FIGURE 4 is an enlarged cross sectional view of the groove on the surface of the manifold pan which receives the adhesive material.

Figure 1:
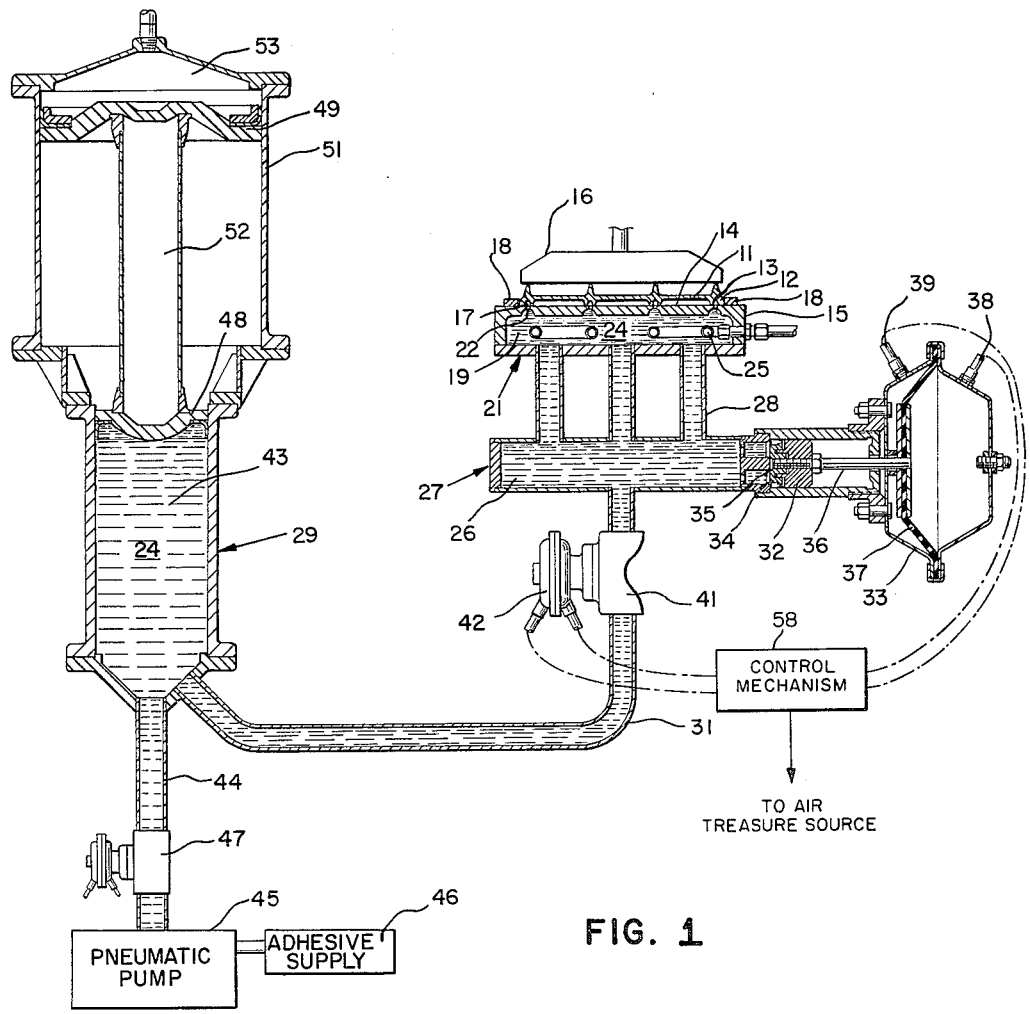
FIGURE 1 is a schematic diagram depicting the various component parts, partially in section, of an apparatus utilized to apply adhesive to the grooved portion of a manifold pan for an internal combustion engine according to the method of this invention.

In FIGURE 1 can be seen a member 11, in this instance a lower pan of a manifold for an internal combustion engine, having a pair of continuous and parallel ridges 12 on its surface. Between each ridge 12 is a continuous groove 13 which will receive a corresponding coextensive tongue of a second member (not shown), in this instance the intake manifold body, which is to be adhesively joined with the lower pan.

The member 11 is placed on the surface 14 of an applicator plate 15 with its ridges 12 in contact with the surface 14. This member 11 is secured to the applicator plate 15 by a clamp 16 which may be actuated by manual, pneumatic, hydraulic or electrical means. A plurality of hollow perforations 17 are placed in the surface 14 of the applicator plate 15 along a line which is coextensive with the groove 13 of the member 11 when the member 11 is properly positioned on the surface 14.

Figure 2:
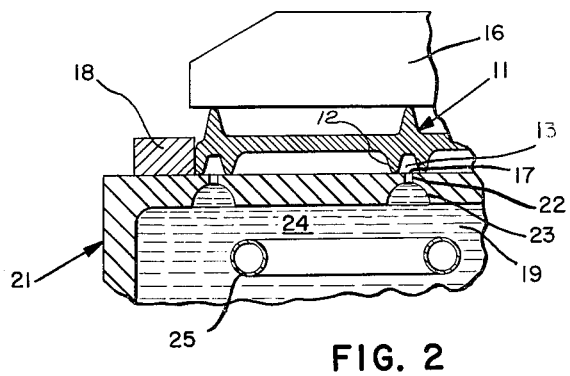
FIGURE 2 is an enlargement of a section through a portion of the applicator plate of the apparatus of this invention.

In FIGURE 2, which is an enlargement of a section taken through a portion of the applicator plate 15, it can be seen that the groove 13 is positioned in relation to the perforations 17 by locating blocks 18 attached to the applicator plate 15. The perforations 17 are placed in communication with a chamber 19 in a secondary mainfold 21 by passageways 22. A semicylindrical continuous groove 23 is milled into the upper surface of the chamber 19 of the secondary manifold 21. This groove 23 passes through the end openings of all the passageways 22 to assure a uniform distribution of a siccative, flowable material such as adhesive 24 in this instance to the hollow perforations 17 when a pressure differential is applied between the chamber 19 and the member 11.

As seen in FIGURE 1, a heating coil 25 may be mounted in the chamber 19 to maintain the adhesive 24 at a uniform viscosity. The chamber 19 of the secondary manifold 21 is connected to a second chamber 26 in a primary manifold 27 by a plurality of distribution tubes 28. The second chamber 26, which is of a cylindrical configuration, is placed in communication with a constant delivery pump 29 by conduit 31.

A piston 32, which is mounted at one end of the second chamber 26, is actuated by a double acting air diaphragm valve 33. A spring brass cup seal 34 circumscribing piston 32 minimizes leakage of adhesive 24 past the piston 32 and also reduces the wear on the cylindrical surfaces of the second chamber 26. A stop plate 35 mounted in the second chamber 26 controls the maximum forward movement of the piston 32. The double acting diaphragm valve 33 actuates the piston 32 through rod 36 when air pressure is applied on its diaphragm 37 through connections 38 which are connected to an air pressure source (not shown). Connections 39 also place the diaphragm valve 33 in communication with the air pressure source (not shown) to reverse the movement of the piston 32.

A valve 41 is installed in the conduit 31 between the primary manifold 27 and the constant delivery pump 29 to control the flow of adhesive 24 in the system. The valve 41, which may be controlled by a second double acting diaphragm 42 or any other suitable control means, is opened for a brief predetermined period of time to force the adhesive 24 through the perforations 17 into the groove 13 of the member 11.

The constant delivery pump 29 has an adhesive storage chamber 43 which is connected through a hose 44 to a pneumatic delivery pump 45. The delivery pump 45 pumps adhesive 24 from the adhesive supply tank 46 to the adhesive storage chamber 43 when a valve 47 installed in the hose 44 is opened.

The constant delivery pump 29 comprises a double-ended piston with a small diameter piston 48 acting on the surface of the adhesive 24 in the adhesive storage chamber 43. The piston 48 is interconnected to a larger piston 49 contained in a cylinder 51 by a connecting rod 52. An air pressure chamber 53 at one end of the cylinder 51 is connected to an air pressure source (not shown) which exerts a uniform force on the piston 49 when activated. This force is transmitted through the connecting rod 52 to the piston 48 acting on the adhesive 24 in the adhesive storage chamber 43.

In FIGURE 3 is seen a plan view of the applicator plate 15. The locating blocks 18 which guide the member 11 into position are secured to the surface 14 by screws 54 and dowels 55. The outline of the ridges 12 of the member 11, in this instance the lower pan, is shown by phantom lines. The perforations 17, of which only a few are shown in FIGURE 3, are spaced equally distant between the ridges 12, the outside ridge 12 in this instance being congruent with the periphery of the lower pan.

In FIGURE 4 is seen an enlarged sectional view of part of a member 11 showing the configuration of a typical groove 13 between the ridges 12 which is to receive the adhesive 24 by the method of this invention. In this illustration, the groove 13 has sloped sides 56 and a radius 57 in each of the two lower corners to facilitate its assembly with a corresponding tongue of a second member (not shown).

The groove 13 formed between the two ridges 12 on the surface of a lower pan of a manifold used as an example in the application of the method of this invention, has a depth of .210 inch and a width of .135 inch across the opening of the groove with the sides 56 having a 5 percent draft. The adhesive 24 applied to the groove 13 has a viscosity of 1,850,000 cps. measured with a Brookfield No. 7 spindle at 2 r.p.m. at 76° F. The perforations 17 in the applicator plate 15 are .054 inch in diameter and spaced .187 inch apart when measured from center to center.

To maintain the adhesive 24 at a uniform viscosity at the point of application, heated water at 150° F. controlled setting is circulated through the heating coil 25 placed in the chamber 19 of the secondary manifold 21. A uniform pressure of 200 pounds per square inch is exerted on the adhesive 24 by the piston 48 of the constant delivery pump 29 to force the adhesive 24 through the passageways 22 into the groove 13 of the lower pan. The double-ended piston is designed to obtain a 5:1 ratio so that the air pressure in the chamber 53 is approximately 40 p.s.i. in order to maintain a uniform pressure of approximately 200 p.s.i. on the adhesive in the system.

The sequence of operation in the application of the method of this invention requires the positioning of the member 11 onto the surface 14 of the applicator plate 15. The member 11 is secured to the surface 14 by applying clamp 16. Then the valve 41 is opened for 6 seconds to force the adhesive 24 through the perforations 17 into the groove 13 of the lower pan. After the valve 41 has been closed, the double-acting diaphragm valve 33 is actuated to withdraw the piston 32 to reverse the pressure on the adhesive 24. This prevents the drool of excess adhesive 24 onto the surface 14 of the applicator plate 15 and the aeration of the adhesive 24. Then the clamp 16 is opened and the member 11 removed from the applicator plate 15. The piston 32 is moved forward against the stop plate 35 during or just prior to the opening of the valve 41 to build up sufficient pressure in the manifolds 21 and 26 before another cycle is started. The positioning and removal of the lower pan and the deposition of adhesive 24 in the groove 13 requires approximately a cycle time of 12 seconds.

All valves and pumps may be selectively controlled by a control mechanism 58 as seen in FIGURE 1 to operate in the proper sequence to suit any chosen application of the method of this invention. The control mechanism 58, which is readily commercially available, can be set to operate the double acting diaphragm valve 33 and valve 41 in any time sequence desired.

It is to be understood that the use of a lower pan of a manifold in this instance is used for illustrative purposes only and that the apparatus of this invention may be applied to any grooved member manufactured from metallic or nonmetallic materials.

We claim:

1. An apparatus for applying an adhesive to a groove on the surface of a member comprising an applicator plate having a surface, means for securing said member to the surface of said applicator plate, a secondary manifold having a first chamber, hollow perforations in said applicator plate placing its surface in communication with said first chamber, a primary manifold having a second chamber, a distribution tube placing said first chamber in communication with said second chamber, an adhesive supply tank, a conduit placing said adhesive supply tank in communication with said second chamber, a first pressure means associated with said supply tank, said first pressure means exerting pressure on said adhesive to force said adhesive into the groove on the surface of said member, a second pressure means mounted in said second chamber, said second pressure means relieving the pressure on said adhesive sufficiently to retain said adhesive in said perforations, and a means for selectively and sequentially controlling said first and second pressure means.

2. An apparatus for applying an adhesive to a groove on the surface of a member comprising an applicator plate having a surface, means for securing said member to the surface of said applicator plate, a secondary manifold having a first chamber, a plurality of hollow perforations in said applicator plate placing its surface in communication with said first chamber, a primary manifold having a second chamber, a distribution tube placing said first chamber in communication with said second chamber, a constant pressure pump, a conduit placing said constant pressure pump in communication with said second chamber, said constant pressure pump having a storage chamber, an adhesive supply tank, a second conduit placing said adhesive supply tank in communication with said storage chamber, a second pump connected to said supply tank, said second pump delivering said adhesive to said storage chamber upon being actuated, said constant pressure pump exerting pressure on adhesive in said storage chamber to force said adhesive into the groove on the surface of said member, a pressure relief means mounted in said second chamber, said pressure relief means relieving the pressure on said adhesive sufficiently to retain said adhesive in said perforations, and a means to selectively and sequentially control said pressure relief means and the adhesive flow from said constant pressure pump.

References Cited by the Examiner

UNITED STATES PATENTS

| | | | |
|---|---|---|---|
| 812,329 | 2/1906 | Daugherty | 113—93 X |
| 1,621,016 | 3/1927 | Jackson | 117—95 |
| 2,166,268 | 7/1939 | Simmons | 118—410 X |
| 2,178,158 | 10/1939 | Aulbach | 118—408 |
| 2,271,063 | 1/1942 | De Mattia | 18—30 |
| 2,324,510 | 7/1943 | Jorgensen | 118—410 X |
| 2,392,229 | 1/1946 | Cohen | 118—408 X |
| 2,771,049 | 11/1956 | Fish | 118—411 X |
| 2,960,060 | 11/1960 | Chatterton | 118—11 X |
| 3,059,610 | 10/1962 | Mintz | 118—7 |

RICHARD D. NEVIUS, *Primary Examiner.*

JOSEPH B. SPENCER, *Examiner.*